A. A. CARPER.
BOTTLE CAPPING MACHINE.
APPLICATION FILED JUNE 14, 1912.
1,299,820.
Patented Apr. 8, 1919.
6 SHEETS—SHEET 5.
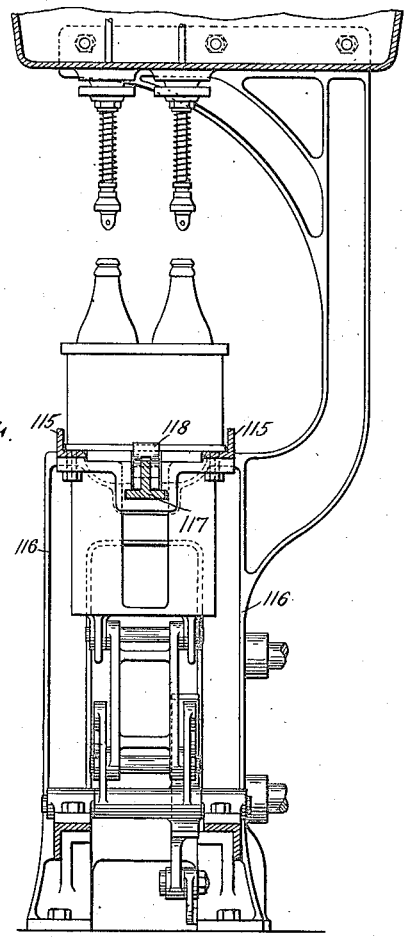
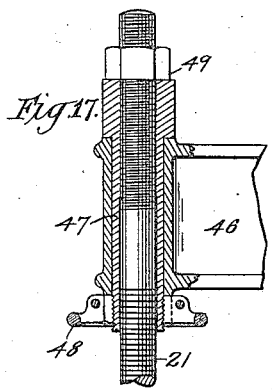
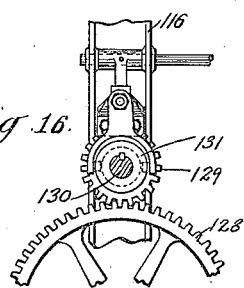
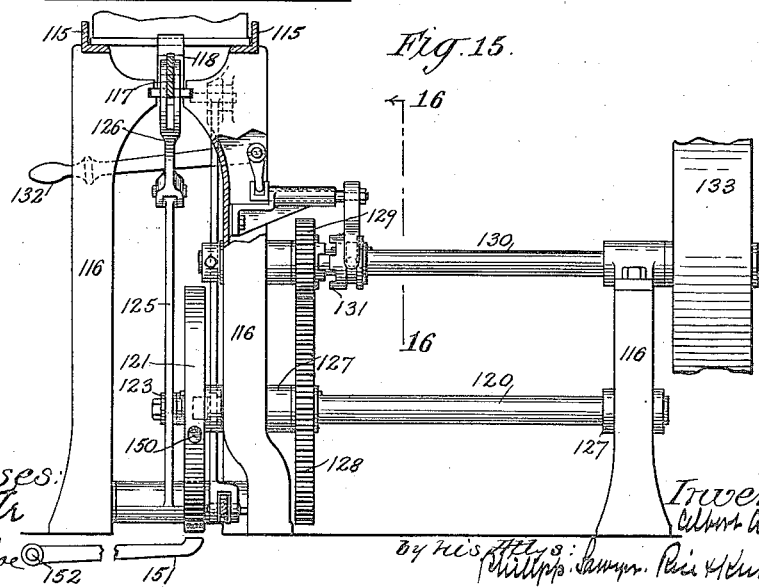

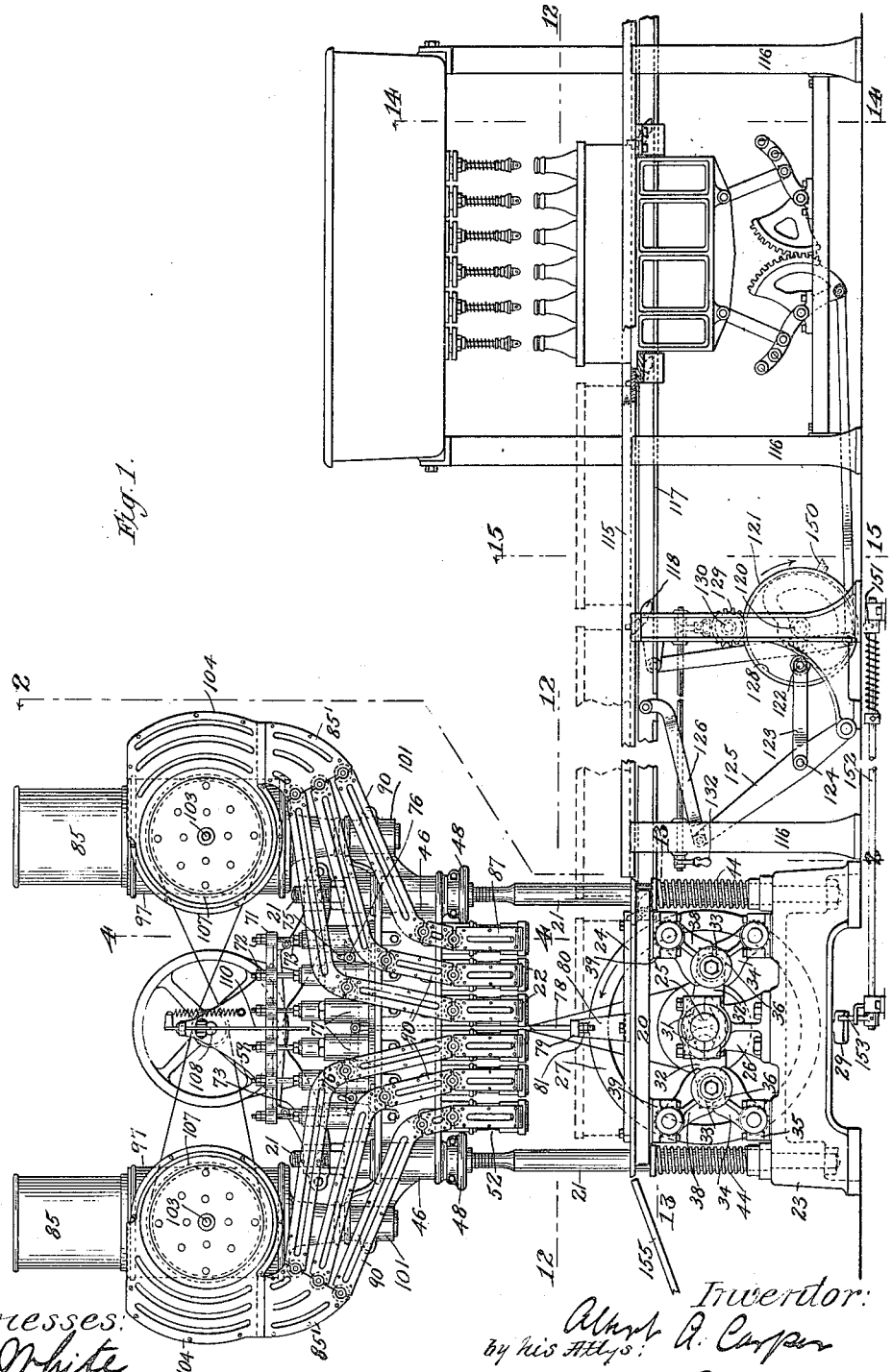

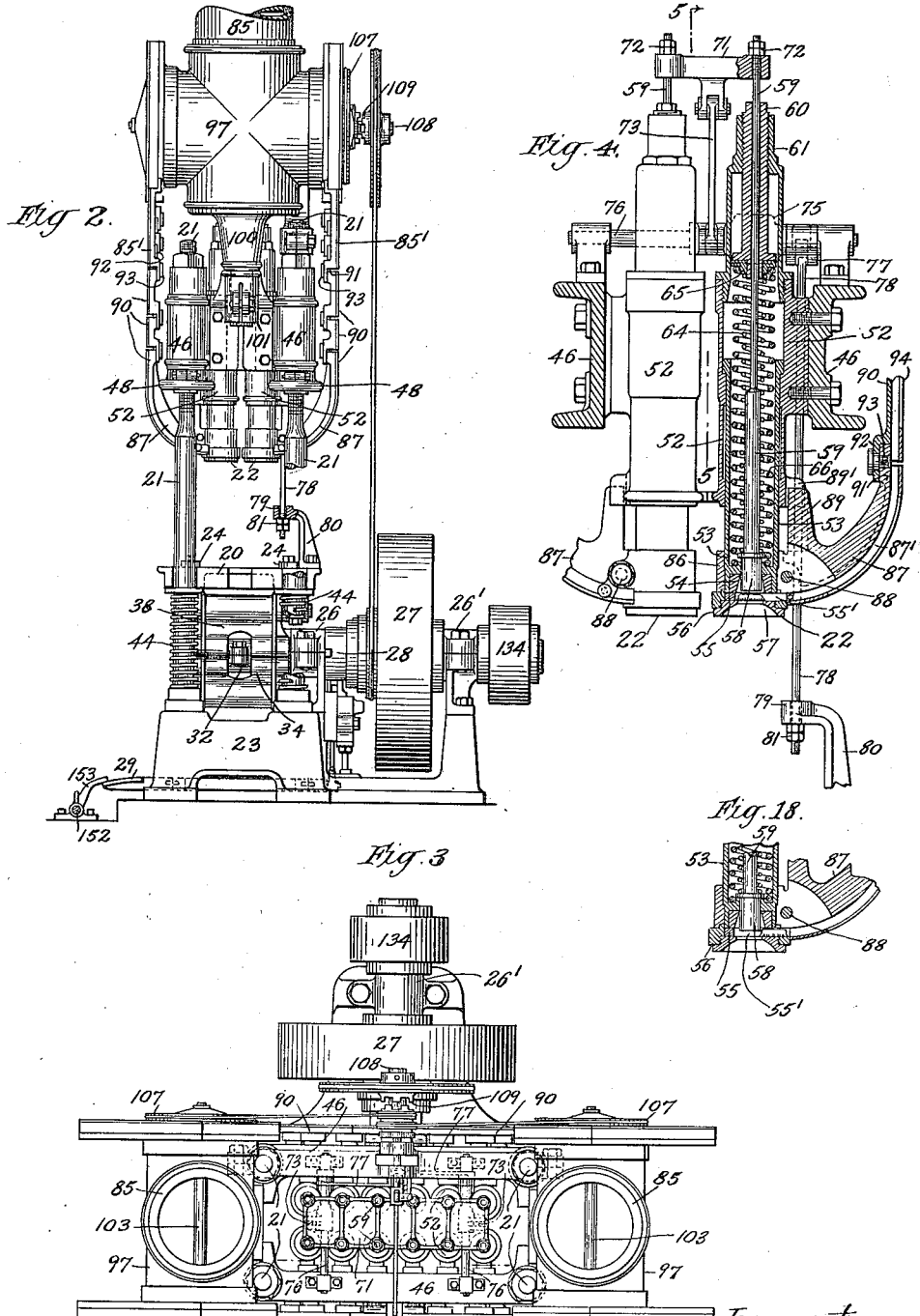

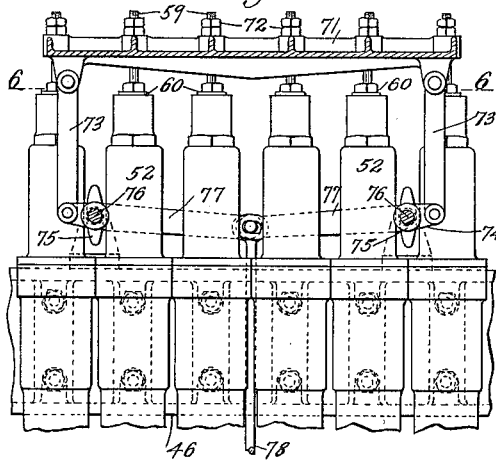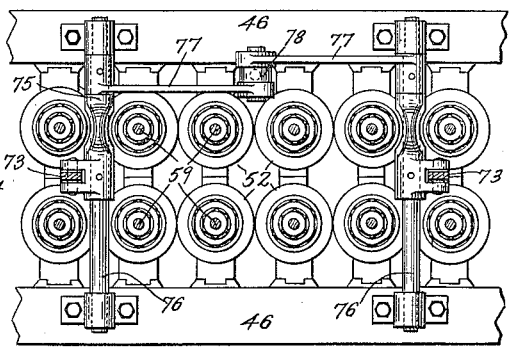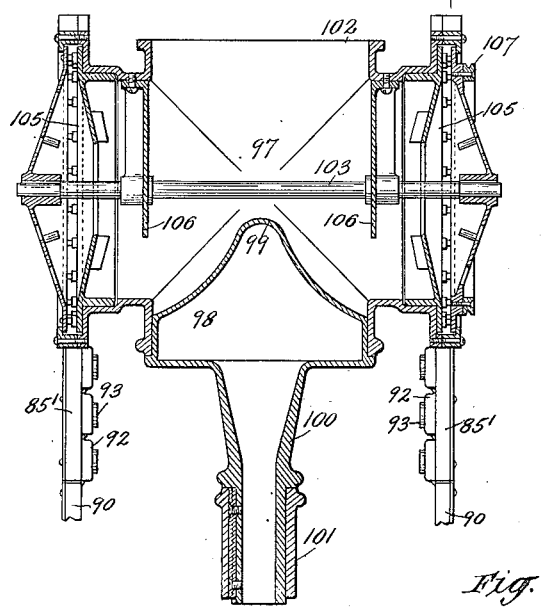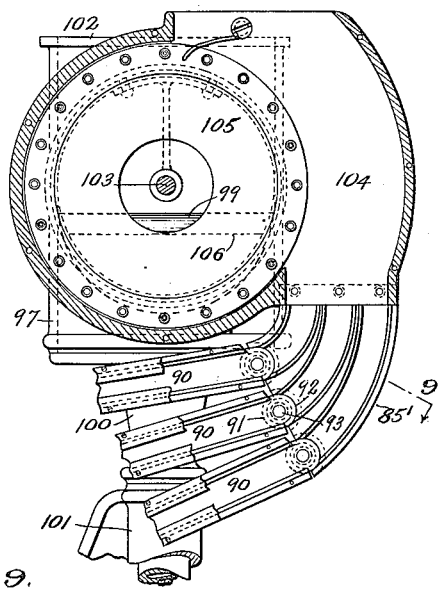

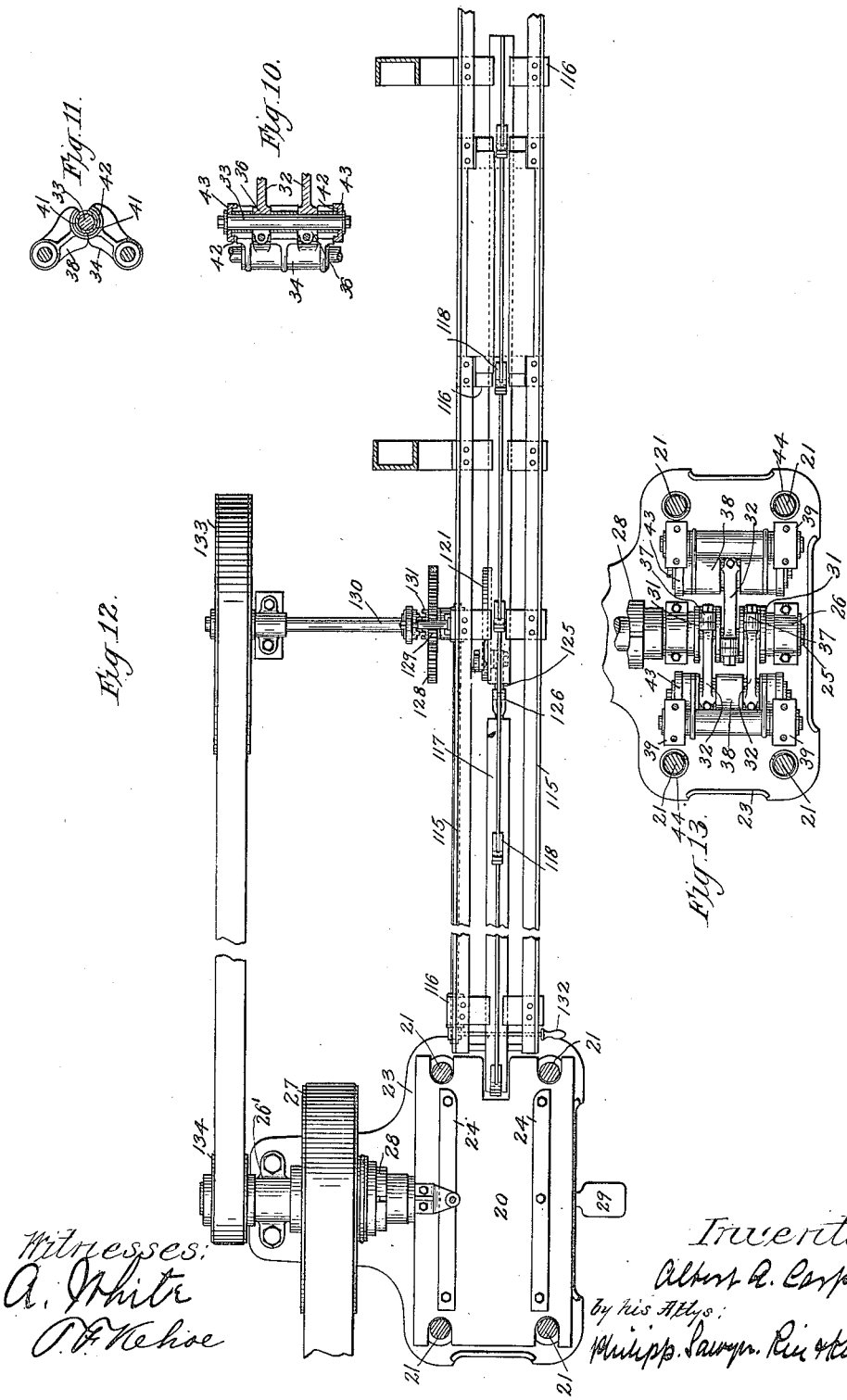

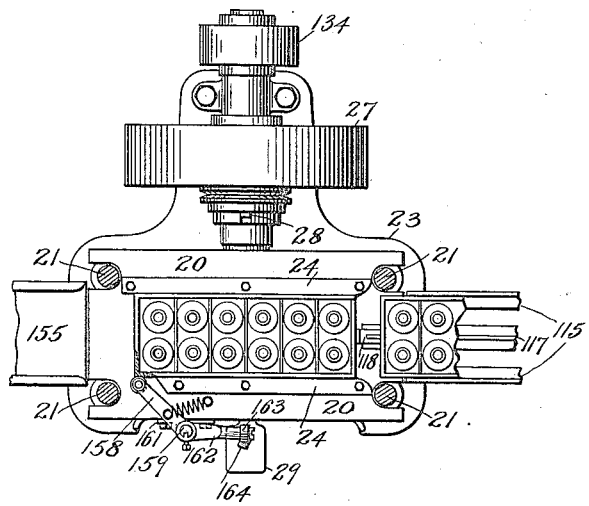
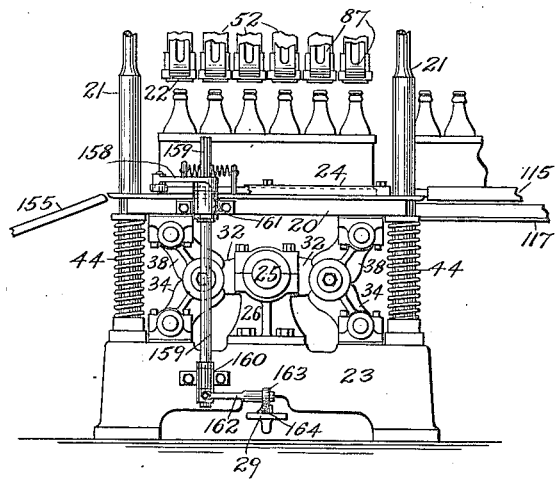

UNITED STATES PATENT OFFICE.

ALBERT A. CARPER, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

BOTTLE-CAPPING MACHINE.

1,299,820.     Specification of Letters Patent.     Patented Apr. 8, 1919.

Application filed June 14, 1912. Serial No. 703,655.

*To all whom it may concern:*

Be it known that I, ALBERT A. CARPER, a citizen of the United States, residing at Baltimore and State of Maryland, have invented certain new and useful Improvements in Bottle-Capping Machines, fully described and represented in the following specification and the accompanying drawings, forming a part of the same.

This invention relates to a machine for automatically applying metal caps to bottles.

One of the objects of the invention is to produce an improved machine in which caps are simultaneously applied by a plurality of cap affixing devices, the caps being automatically supplied to said devices, and provision being made for capping bottles of varying heights.

A further object of the invention is to provide an improved capping mechanism which will insure the ready ejection of the capped receptacles from the capping devices, the operation being such, however, that the mechanism does not exercise force which is liable to break the bottles during the capping operation.

A further object of the invention is to provide an improved mechanism for bringing the receptacles into proper relation with respect to the capping mechanism, so that the capping operation may be effected.

A further object of the invention is to provide an improved mechanism for handling and presenting bottles or receptacles in cases to the packing mechanism.

With these and other objects not specifically referred to in view, the invention consists in certain constructions and in certain parts, improvements and combinations as will be hereinafter fully described and then specifically pointed out.

Referring to the accompanying drawings:

Figure 1 is a side elevation of a transferring and capping machine embodying the principles of the invention;

Fig. 2 is a section on the line 2—2 of Fig. 1, looking in the direction of the arrows;

Fig. 3 is a top view of the same;

Fig. 4 is a detail sectional view taken on the line 4—4 of Fig. 1;

Fig. 5 is a detail sectional view on the line 5—5 of Fig. 4;

Fig. 6 is a top view of the same;

Fig. 7 is a sectional view through one of the feed hoppers;

Fig. 8 is a sectional view on the line 8 of Fig. 7, looking in the direction of the arrow;

Fig. 9 is a section on the line 9 of Fig. 8, looking in the direction of the arrow;

Fig. 10 is a longitudinal section through one of the table elevating toggles;

Fig. 11 is a transverse section of the same;

Fig. 12 is a plan view of part of the transferring mechanism for the cases of bottles, being taken on the line 12—12 of Fig. 1;

Fig. 13 is a section on the line 13—13 of Fig. 1, looking downward;

Fig. 14 is a section on the line 14—14 of Fig. 1, and generally showing a right-hand end of the transfer mechanism;

Fig. 15 is a section on the line 15—15 of Fig. 1;

Fig. 16 is a detail elevation, being generally a view taken on the section 16—16 of Fig. 15, looking in the direction of the arrow;

Fig. 17 is a detail sectional view of an adjustment for the cap affixing frame in Fig. 1;

Fig. 18 is a detail sectional view of the cap affixing throat;

Fig. 19 is a detailed side elevation showing a modification of the filling table control mechanism;

Fig. 20 is a sectional plan view of the same.

Constructions embodying the invention will include a table on which the cases of bottles rest during the capping action. There will also be a gang of cap affixing throats or dies, generally two rows with six dies in a row so as to provide for the simultaneous capping of a dozen bottles. Besides such relative movement between the table and cap affixing throats as is necessary to provide for the capping action, there will be an adjustment to suit bottles of different heights and means for compensating for minor variations in height. Coöperating with the cap affixing throats there will be provided a plurality of individual feeds from suitable hoppers or sources of supply for the caps. In the best constructions embodying the invention a table 20 comprising a flat plate or frame guided between four posts 21 is vertically movable toward and from a gang of cap affixing throats 22.

This table 20 receives the cases of bottles on its upper surface between parallel guiding bars 24 separated by a distance equal to the width of the cases. This distance is less than the widthwise separation of the posts 21 so that the cases may pass into position from one side and be discharged from the other side between the posts. These posts 21 project upward from a base 23 in which they are rigidly socketed and secured. This same base also constitutes a support for the power shaft 25 journaled in bearings 26 on the base and having an outerboard bearing 26' and a driving pulley 27. The shaft 25 constitutes a part of a mechanism for elevating the table 20, and this table elevating mechanism is adapted to operate periodically and with great power and certainty by a parallel motion communicated to the table to lift all portions thereof equally to a definite or predetermined height. In the best constructions the shaft 25 is not affixed to the driving pulley 27, but is adapted to be intermittently clutched to this pulley by a clutch 28 of any suitable or desired construction. A treadle 29 extends through the base 23 and has connections for operating the clutch 28. In addition to these features, the shaft 25 will have a plurality of cranks 31 formed thereon between its bearings 26, and from these cranks extend pitmen 32 to the wrist pins 33 of rock-arms 34, these rock-arms 34 having journals 35 in the base 23 of the machine. Three pitmen 32 are illustrated, two extending from two alined cranks in one direction, while the third is an intermediate pitman extending from a diametrically opposite crank in the opposite direction. All these pitmen 32 are joined to the rock-arms 34 by adjustable straps 36 and are joined to the cranks 31 by removable caps 37. In addition to the rock arms 34 thus far described, there are links 38 journaled to the table at 39 and pivoted to the upper ends of the rock arms 34, and where this construction is employed, there is provided a form of joint or union between the links 38, pitmen 32 and rock arms 34 having various advantages as will appear.

Referring particularly to Figs. 10 and 11, the pins or arbors 33 are thrust through the outer alined openings of the straps 36 of the pitmen 32. In the construction shown, the rock arms 34 and the links 38 have arcuate recesses 41 at their ends to engage the pins 40, instead of eyes, the angle subtended by such arcuate extremities 41 being less than 180°, so that although both the links 38 and the rock-arms 34 are simultaneously in contact with the pins 33, they can nevertheless have an angular movement with respect to one another to the extent that the sum of their subtended arcs is less than 360° These links 38 and rock arms 34 also have annular shoulders 42 adapted to be embraced or inclosed by flanged caps or cup-shaped parts 43 which fit over the annular shoulders 42 and maintain both the links and the rock-arms in permanent engagement with the pin arbors 33. Any suitable lubrication openings through the arbors will supply oil for the entire series of pivots.

With this form of mechanism the table 20 is elevated by a movement which is a substantially parallel motion at the upper limit. Such deviation as there may be from strict parallelism in the table movement is negligible; also the forces on the table are substantially balanced so that the guiding posts 21 are not subjected to severe duty. The corners of the table may be cut away and rounded, as shown in Fig. 12, and ride against the corner posts 21 thus constituting an additional guiding means. With the same end in view, springs 44 are coiled around the posts beneath the table, tending to lift the latter so that considerable strain is taken off the clutch 28, and the action of the machine is equalized and made more elastic.

Above the table 20 will be located the gang of capping dies or cap affixing throats, and in the best constructions embodying the invention there will be a capping die frame or head frame adjustable on the posts 21 vertically toward and from the table 20. This head frame carries the cap affixing throats and their associated devices for the purposes referred to in the preliminary part of the specification. In practice, a hollow rectangular or open frame 46 has vertical holes at the corners for the posts 21 and at these corners will be arranged adjusting nuts comprising a sleeve 47 (see Fig. 17) threaded to the posts 21 and rotatable thereon by means of a hand-wheel 48. In order to take up lost motion the hand-wheel 48 is itself adjustable on the sleeve 47, being clamped thereto in any desired position of adjustment. Lock nuts 49 may be employed to hold the parts in fixed position when the head frame has been brought to the required elevation. With this form of head frame there is provided a plurality of movable heads, capable of independent vertical movement on the head-frame, each movable head having a throat into which the heads of the bottles will be guided. While the construction may be varied in this respect, there is employed a tubular casing or extension 52 on the head-frame and located within the rectangular outline thereof. This constitutes the stationary head for each capping die. In each of these tubular sleeves there telescopes a tubular part 53 constituting the movable head, the latter carrying the throat 54 and also a throat ring 55 and a guide-nut 56. The throat-ring 55 is located directly beneath the throat 54 and is generally U-shaped so as to establish a recess 55′ into which the caps are received from the feeding hoppers. This recess is of course larger than the tapering cavity of the throat directly above it. Directly beneath this cavity of the throat-ring there is a hole or opening 57 of the guide-nut 56 which has a bell-shaped mouth to guide the bottles into the opening. This guide-nut 56 screws into a threaded aperture of the movable head 53, thereby clamping the throat-ring 55 firmly in place. Within the throat there is provided a plunger 58 which is continued upward by an extension stem 59 passing through a brass or similar adjustment sleeve 60 which is threaded into the head extension 61. This plunger is provided for the purpose of assisting or coöperating in the capping operation and also for assisting in the ejection of the capped bottles.

A shoulder 63 on the plunger 58 constitutes an abutment for a comparatively long spiral spring 64 of comparatively small power. This spring finds its upper abutment on a friction ring 65 of the adjustment sleeve 60. There is also a comparatively powerful and also comparatively long spiral spring 66 which finds its upper abutment on the friction ring 65 and thereby on the adjustment sleeve 60, bearing downward at its lower end on the movable head 53. The power of this spring is sufficient to furnish adequate capping pressure, and the length of this spring is so great that there is no appreciable increase in pressure in the case of unduly tall bottles, (it being understood that there are minor variations in the heights of different bottles which pass in the trade for uniform size). It may be repeated at this point that the adjustment for different actual sizes, such as pints, quarts, and half-pints, is made by elevating the entire head frame by the four adjustment wheels 48 on the corner posts 21.

The stems 59, and thereby the plungers 58, have a vertical movement independent of the throats through which they pass. While the construction may be varied, as illustrated it includes a yoke 71 which constitutes a common cross-head for all the stems 59, the latter being secured to the cross-head by check-nuts 72. At each end this cross-head carries a depending link 73 which is pivoted to the short arm 74 of a rock-frame 75. The links 73 extend symmetrically down from the cross-head between the two rows of cap affixing throats. The shafts 76 of the rock-frames 75 are journaled outside the cap affixing throats on the open head-frame 46. The long arm 77 of the rock-frames 75 extend toward one another to a common connection with a link 78 which depends within the rectangular outline of the open head-frame, but outside of the group of cap affixing throats, as clearly shown in Figs. 5 and 6. At its lower end this latter link 78 passes loosely through an eye 79 of the bracket 80 of the table 20, and has a stop established by a pair of check-nuts 81 beneath this eye. The result is that the descent of the table pulls on the link 78, oscillating the rock-frames 75 and elevating the cross-head 71 and all of the plungers 58. Thus all the plungers are elevated, as shown in Fig. 4, when the table 20 is in its descended or normal position.

The cap feeding or supply means may include a hopper or hoppers 85 and chutes leading therefrom to the cap affixing throats. As already described, where there is a throat-ring 55 of U-shape, the best construction is to provide a strap 86 clamped about each movable head 53 and having a curved chute 87 attached thereto by a pin or pivot 88, this chute also having a rigid lug 89 extending upward into a recess 89′ of the stationary head 52, whereby the position of the chute is controlled while permitting a vertical movement. The curved passage 87′ of this chute 87 is in alinement with the aperture 55′ already described of the throat ring 55, so that the caps are free to pass into the throat ring, where they rest on the guide-nut 56 below. It is evident that until compressed upon the bottle the caps are so expanded that they do not fall through the opening of the guide-nut. Into the curved chutes 87 the caps are led through separate flexible channels which extend downward from the feeding devices and from the hoppers.

Referring particularly to Fig. 1, the feed channels appear in the flexible form just referred to, six channels 90 being shown extending to the row of cap affixing throats on this side of the machine. Similar channels are provided on the opposite side of the machine. Each channel has three joints, the lowermost joints being to the curved chutes 87 and the uppermost joints being to a feed hopper outlet or mouthpiece 85′ of segmental form. The character of the joints of these flexible feed channels should be such as not to interfere with the free passage of the crowns or caps. While the construction may be varied, as shown (see Figs. 4 and 8), one section of the flexible channel may have a projecting tongue 91, and the other an overlying bracket or extension 92 centrally pivoted to the tongue 91 by a screw 93. In this way the back inside wall of the channel is always continuous and uninterrupted regardless of the angular adjustment between the two channel sections. The corresponding side walls of the channel sections approach one another to such an extent that they abut on one side at one extreme of angular movement between the channel sections. At this time there is the greatest gap or opening at the opposite side of the channel, but such latter gap is entirely closed when the channel sections are flexed to their limit of angular movement in the opposite direction. The cover plates 94 of the channel sections have extremities separated slightly from the extremities of the cover plates of the adjacent sections. By this means a free channel is provided for the caps, regardless of extensive permanent angles between the channel sections, and further regardless of variations in the angles due to the flexing of the flexible channels. By this same character of joint the channels are eventually secured to the feed hopper outlets 85' already described.

Referring particularly to the closure containing hopper and feeding mechanism (see particularly Figs. 7 and 8) means are shown by which a single receptacle is made capable of feeding caps to six channels simultaneously on two sides of the machine. A generally cross-shaped tubular receptacle 97 may be provided, the bottom leg of which is closed by a plug 98 having a V-shaped top surface 99, and further having a downwardly extending standard 100 which is received in a socket 101 of the head-frame 46. The vertically upward extending hollow leg 102 of the cross-shaped tubular receptacle communicates with any suitable pipe (preferably contracting as it proceeds upward) which leads to the floor or location above, where the caps are poured into the tubes in quantities. A transversely extending shaft 103 is shown extending through the cross-shaped tubular receptacle 97, having feeding disks 105 thereon of known form, this shaft being journaled in depending webs 106 which further constitute partitions. In this way the movement of the caps must be through the openings beneath such partitions. The caps are fed out through selecting openings at the periphery of the feeding disks 105 so that they accumulate in a properly arranged group, flatwise and uniformly faced in the chamber 104, from which they fall readily into the channels of the feed-hopper mouth pieces 85'. It will be observed that by this means the caps are fed to six feed-channels at once, and the entire action is secured through a single operating shaft. In order to drive this shaft, a pulley 107 is provided on the outside of one of the feed-disks 105. The entire arrangement of feeding hopper is duplicated to the extent shown in Fig. 1, and there is a shaft 108 on the machine from which the respective feeding disks are driven. This latter shaft has a clutch 109 operated by a handle 110, see Figs. 1 and 3. In this way the feeding action of the machine is interrupted whenever desired.

A feed channel is provided, comprising a pair of channel irons 115 extending away from the table 20 parallel to one another, and at such a distance of separation as to constitute a chute or channel through which the cases of bottles may be pushed. At intervals supporting standards 116 from the flooring will support these channel-irons 115. Between the channel-irons 115 and guided by the supporting standards 116 is a longitudinally slidable feed rod 117, preferably a piece of T-iron with the web or fin projecting upward. Straddling this fin and pivoted thereto are dogs 118, see Fig. 12, which are so weighted that their upstanding ends project into the space between the channel irons 115 and above the bottom level thereof. But the pivoted character of these dogs enables them to tilt forward (although not backward) and in this way be depressed below the level of the channel-irons 115, and thereby below the level of the bottle cases. Means are provided for reciprocating the feed rod 117, the means used being preferably such as to give a quick forward movement and a slow return. Such mechanisms are known in mechanics, in various forms, for example, the "Whitworth quick return," the "elliptic gear," etc., and need not be particularly illustrated or described. A more or less diagrammatic representation is given, including a constantly rotating shaft 120 having a crank wheel 121, a crank pin 122, a connecting rod or pitman 123, and a wrist pin connection 124 with a rock-lever 125 which in turn has a link connection 126 with the feed rod 117. The shaft 120 is supported in bearings 127 and is driven through gears 128 and 129, the latter gear being a pinion loose on a countershaft 130, and adapted to be clutched thereto by a clutch 131 operated by a handle 132. A comparatively large pulley 133 on this countershaft 130 is belted to a smaller pulley 134 on the main driving shaft of the machine. In this way the feed rod 117 is caused to reciprocate, and the cases of bottles will move by successive steps of feeding motion along the channel irons 115 to the table 20 where the bottles are capped. It will be understood that in the return or backward movement of the feed rod 117 the dogs 118 simply dip loosely under the cases but in each forward movement of the feed rod the dogs firmly engage the backs of the cases and push the latter forward for a distance equal at least to their own length. In this displaced position the cases will remain during the next return movement of the feed rod 117 and will be again stepped along their entire length at the next succeeding operation. Thus the boxes are fed from one end of the feed channel to the other, regardless of the length of this channel, which may extend entirely across the bottling works if desired. Of course, it is not desired that the invention be strictly limited to the precise form of dogs 118, channel irons 115, and feed rod 117, as just described and shown.

In order to avoid any elevation of the table 20 before a case of bottles is properly in place, which would evidently cause the breakage of the bottles and interfere with the feed of the cases, the mechanism is so arranged that the table 20 is stationary until a case of bottles is properly placed thereon. For this purpose the clutch 28 is thrown into action by the positioning of a case on the table 20 or such action of the forwarding or transferring mechanism as corresponds to the proper positioning of a case on the table 20. Any desired form of connection may be employed for accomplishing this. One construction selected for the purposes of illustration, includes a cam projection 150 on the wheel 121, this projection rotating into contact with an arm 151 of a rock-shaft 152, said rock-shaft having a second arm 153 adapted to depress the treadle 29. The location of the projection 150 is such that it comes into engagement to actuate the treadle 29 and the clutch 28 just after the feed rod 117 has been withdrawn from its position over the table 20, the case of bottles having been deposited in the forward movement of such feed rod. Even if it should happen that the forward movement of the feed-rod has been an idle one, with no case of bottles deposited on the table 20, still no harm is done by the elevation of the table 20, since it will have returned to normal position ready to receive the next case before the feed-rod 117 has completed a sufficient movement to supply such further case.

A modified arrangement is however illustrated in Figs. 19 and 20, which avoids any movement between the table 20 and the capping dies unless a case of bottles is properly in place. In this construction an arm or tappet 158 extends out across the top of the table 20 into the path of the advancing cases of bottles so as to be displaced thereby. This tappet is illustrated as fixed to a vertical shaft 159 journaled in bearings 160 and 161 on the main frame and on the table respectively, the shaft 159 having a rigidly projecting arm 162 beneath the base 23. The arm 162 has a cam roller 163 riding over a cam surface 164 on the treadle 29 so as to depress said treadle whenever the shaft 159 is rocked by a case of bottles. The clutch mechanism 28 already referred to, is of the known character which stops automatically after one actuation when the treadle has been depressed, regardless of the continuous depression of the treadle. As soon as the capped case of bottles is removed however the treadle returns and the subsequent depression due to the next case of bottles will result in a new actuation.

In operation, the cases of empty bottles are supplied by an attendant at a suitable point in the feed channel, and the same are forwarded in the manner already described, that is, by a step-by-step movement, until they arrive on the table 20. As soon as the case is properly placed on the table 20 and has been left entirely free by the withdrawal of the feed rod which propels such case onto the table, the tripping mechanism for the clutch 28 comes into action, and the table 20 is elevated by the toggle joints. In so elevating the case of bottles it will be evident that the head of each bottle is guided against the bell-shaped mouth of a corresponding capping die, whereby the bottle heads are directed into the cap-affixing throats. In this movement the bottle heads pick up a cap which has previously been deposited on the upper surface of the guide nut 56, so that the associated cap and bottle heads will move upward together into the tapering cavity of the cap affixing throat 54. In this action the plunger 58 bears on the top of the cap with the full pressure of its spring 64 and this pressure is sufficient to prevent the cap from buckling while the flange is being pressed inward. This construction is particularly effective where closures made of very thin tin are employed, but it is not limited to the application of such closures, since the presence of the plunger 58 does not interfere in any way with the use of the thickest tin plate which is ever employed in the manufacture of caps. The bottle is pressed up into the cap affixing throat to its limit of movement, which limit is uniform for all of the bottles on account of the fact that the table has a movement which is strictly parallel to the horizontal plane of all the cap affixing throats at the upper limit of its movement. It will further be observed that at this limit of upward movement the power of the table movement is greatest, thus insuring the crimping-in of the flange of the crown cap to the extent necessary to produce an absolutely hermetic seal. As the table commences its downward movement, the case of bottles is lowered, the caps now passing through the openings 57 of the guide-nuts on account of the fact that the flanges have been compressed inward to a smaller diameter. The spring pressed plungers 58, resting on the tops of the bottle caps, assist in this movement. When the table reaches its fully depressed position, the link 73 is pulled downward slightly and through the rock-frames 75 the cross-head is elevated a short distance. This elevation of the cross-head 71 raises all of the plungers 58 above the level of the caps which are supplied through the curved chutes 87. The result is that a new cap is pressed by the weight of those above into each of the cap affixing throats, in readiness for a new actuation of the machine, when another case of filled bottles arrives on the table 20. The properly filled case is removed from the table 20 by any suitable withdrawing means, such as an inclined track 155 leading away from the table 20 on the side opposite to that from which the cases are supplied.

While the invention has been particularly described in a practical construction or constructions in such detail as to enable the same to be practically manufactured and used, it is not desired that the invention be limited to this exact structure or structures, since variations may be made without departing from its spirit and scope.

What is claimed is:—

1. In a machine for capping a plurality of receptacles, a table for receiving a case of receptacles, a pair of sets of toggle levers for elevating the table, a power shaft beneath the table and intermediate said sets of toggle levers, links for joining said toggle levers to said shaft, and a vertically adjustable group of dies above the table, said dies being in rows corresponding to the rows of receptacles in the case.

2. In a machine for capping a plurality of receptacles, a table for receiving a case of receptacles, a power shaft having cranks beneath the table, toggle links having arcuate ends and arranged at each side of said cranks, pins between said ends of the links, means for retaining the links in position with respect to the pins, and connections between the cranks and toggles.

3. In a machine for capping a plurality of receptacles, a table for receiving a case of receptacles, a power shaft having cranks beneath the table, toggle links having arcuate ends and located at each side of said cranks, pins between said ends of the links, caps on said pins and embracing portions of said links, and links joining said cranks and said pins.

4. In a machine for capping a plurality of receptacles, a table for receiving a case of receptacles, a power shaft having cranks beneath the table, a toggle joint device located at each side of said power shaft, each toggle joint including links having arcuate ends and arcuate shoulders, pins between said links, caps on said pins embracing said shoulders to hold the links on the pins, and links joining said pins and said cranks.

5. In a machine of the class described, a stationary head, a movable head telescoping therein, a compression spring in said movable head, a cap-affixing throat on said movable head, a plunger arranged to extend into said throat and having an upward extending stem, and means for elevating and depressing said plunger independently of the movable head.

6. In a machine of the class described, a stationary head, a movable head telescoping therein, a comparatively long powerful compression spring in said movable head, a cap affixing throat on said movable head, a plunger extending through said throat and having an upwardly extending stem, and means for elevating and depressing said plunger independently of the movable head.

7. In a machine of the class described, a stationary head, a movable head telescoping therein, a comparatively long powerful compression spring in said movable head, a cap affixing throat on said movable head, a plunger extending through said throat and having an upwardly extending stem, a spring for depressing said plunger, and means for positively elevating said plunger independently of the movable head.

8. In a machine of the class described, a table, a stationary head, a movable head telescoping therein, a comparatively long powerful compression spring in said movable head, a cap affixing throat on said movable head, a plunger extending through said throat and having an upwardly extending stem, a spring for depressing said plunger, and means actuated by said table for positively elevating the plunger independently of said movable head.

9. In a machine of the class described, a plurality of stationary heads, a plurality of movable heads, each telescoping in its corresponding stationary head, a compression spring in each movable head, a cap-affixing throat on each movable head, a plunger for each head each plunger being arranged to extend through the respective throat and having an upwardly extending stem, a common cross head for said stems, and means actuated by the descent of the table for elevating said stems independently of the movable heads.

10. In a machine for capping a plurality of receptacles, a plurality of stationary heads, a plurality of movable heads, curved chutes pivoted thereto, said chutes having extensions slidably engaging said stationary heads, flexible channels joined to said chutes, and a common feeding means for supplying caps to said channels.

11. In a machine for capping a plurality of receptacles, an open frame, stationary heads supported by said frame in a plurality of rows, independently movable heads carried by the stationary heads, separate cap supplying chutes for said movable heads, independent channels for said chutes and a common feeding means for supplying caps to all of said channels, said feeding means including a single rotating member having feeding disks on both sides of the machine.

12. In a machine for capping a plurality of receptacles, an open frame, stationary heads supported by said frame in a plurality of rows, independently movable heads carried by the stationary heads, separate cap supplying chutes for said movable heads, independent channels for said chutes, and a common feeding means for supplying caps to all of said channels, said feeding means including a divided hopper and a single rotatable member having feeding disks on both sides of the machine.

13. In a machine for capping a plurality of receptacles, a plurality of movable heads, separate feed channels therefor, a divided hopper having a V-shaped bottom, and a single rotary member having feed disks on opposite sides of the hopper for supplying channels on opposite sides of the machine.

14. In a machine for capping a plurality of receptacles, a feed hopper, a cap affixing throat, and a flexible channel joined to said feed hopper and said cap affixing throat, said channel comprising independent channel sections having a tongue and an overhanging bracket respectively, said bracket and tongue being centrally pivoted together, said channel sections further having said walls separated by gaps at the joints to permit the requisite movement of the channel section, and further having cover plates with V-shaped ends abutting at their apexes.

15. In a machine for capping a plurality of receptacles, an open frame, stationary heads supported by said frame in a plurality of rows, independently movable heads, a pair of cross - shaped tubular hoppers socketed in said open frame, each hopper having a pair of feed disks at the extremities of its horizontal arms, and flexible channels leading from each feed disk to a plurality of movable heads.

16. In a machine for capping a plurality of receptacles, an open frame, stationary heads supported by said frame in a plurality of rows, independently movable heads, a pair of cross - shaped tubular hoppers socketed in said open frame, each hopper having a pair of feed disks at the extremities of its horizontal arms, and flexible channels leading from each disk to a plurality of movable heads, one feed disk of each hopper having a driving pulley.

17. In a machine for capping a plurality of receptacles, a base having rigidly projecting corner posts, a head frame having openings in the corners for said corner posts, sleeves threaded to said posts within said openings, and means for taking up vertical lost motion between said sleeves and frame.

18. In combination with a capping machine having a plurality of cap-affixing throats, a feed table, a feed channel communicating with said table, a feed rod for propelling cases of receptacles along said channel, and means controlled by the position of a case on said table for relatively moving the table and throats.

19. In a machine for capping a plurality of receptacles, a base having rigidly projecting corner posts, a head-frame having openings in the corners for said corner posts, sleeves threaded to said posts within said openings, and wheels for rotating said sleeves, adjustably mounted on said sleeves.

20. In combination with a capping machine having a plurality of cap-affixing throats, a table, a feed channel, means for intermittently moving cases of receptacles along said feed channel and onto said table, and means controlled by the position of a case on said table for relatively moving the table and throats.

21. In combination with a capping machine having a plurality of cap-affixing throats, a table, means for relatively moving the table and throats, a clutch for actuating said means, a feed channel for cases of receptacles, means for giving the cases an intermittent movement in said channel, and means for tripping said clutch controlled by the position of a case of receptacles on said table.

22. In combination with a capping machine having a plurality of cap affixing throats, a table, a feed channel, means for intermittently moving cases of receptacles along said feed channel and onto said table, a controlling member associated with the table to be engaged by a properly positioned case of receptacles on said table, and means placed in operation by said engagement of a case of receptacles with the controlling member for relatively moving the table and the cap affixing throats.

23. In combination with a capping machine having a plurality of cap affixing throats, a table, a feed channel, means for intermittently moving cases of receptacles along said channel and onto said table, means for relatively moving the table and the cap affixing throats, a clutch for actuating said means, a treadle for operating said clutch, said treadle having associated therewith a cam member, a roller, a rock shaft carrying said roller, and a tappet on said rock shaft position to be engaged by a properly positioned case of receptacles on the table.

In testimony whereof, I have hereunto set my hand, in the presence of two subscribing witnesses.

ALBERT A. CARPER.

Witnesses:
HARVEY COALE,
H. M. HAITHE.